(12) United States Patent
Nichols et al.

(10) Patent No.: US 6,764,529 B2
(45) Date of Patent: Jul. 20, 2004

(54) MEMBRANE GAS DEHYDRATING APPARATUS FOR GAS CONTROLLED AND POWERED SYSTEMS

(75) Inventors: Randall W. Nichols, Westlake, OH (US); Jeff Malarik, Independence, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/186,408

(22) Filed: Jul. 1, 2002

(65) Prior Publication Data

US 2004/0000233 A1 Jan. 1, 2004

(51) Int. Cl.$^7$ .......................... B01D 53/22; B01D 53/26
(52) U.S. Cl. .......................... 95/52; 96/8; 96/10; 96/14
(58) Field of Search .................. 95/52; 96/7–10, 96/14

(56) References Cited

U.S. PATENT DOCUMENTS

| | | | | |
|---|---|---|---|---|
| 4,397,661 A | * | 8/1983 | King et al. | 96/8 |
| 4,670,145 A | * | 6/1987 | Edwards | 210/321.87 |
| 4,718,921 A | * | 1/1988 | Makino et al. | 95/52 |
| 4,857,081 A | * | 8/1989 | Taylor | 95/52 |
| 4,883,023 A | * | 11/1989 | Tsang et al. | 123/25 A |
| 4,929,259 A | * | 5/1990 | Caskey et al. | 210/321.89 |
| 4,961,760 A | * | 10/1990 | Caskey et al. | 210/321.89 |
| 5,002,590 A | | 3/1991 | Friesen et al. | |
| 5,013,331 A | * | 5/1991 | Edwards et al. | 95/22 |
| 5,013,437 A | * | 5/1991 | Trimmer et al. | 210/321.78 |
| 5,067,971 A | * | 11/1991 | Bikson et al. | 95/52 |
| 5,084,073 A | * | 1/1992 | Prasad | 95/52 |
| 5,160,514 A | * | 11/1992 | Newbold et al. | 96/8 |
| 5,259,869 A | * | 11/1993 | Auvil et al. | 95/52 |
| 5,282,964 A | * | 2/1994 | Young et al. | 210/321.8 |
| 5,282,966 A | * | 2/1994 | Walker | 210/321.8 |
| 5,314,528 A | * | 5/1994 | Monereau | 95/55 |
| 5,411,662 A | * | 5/1995 | Nicolas, Jr. et al. | 210/321.8 |
| 5,470,469 A | * | 11/1995 | Eckman | 210/321.8 |

(List continued on next page.)

OTHER PUBLICATIONS

Bendix Trailer System–Guard Air Dryer Publication, Sep. 1999, USA.

*Primary Examiner*—Robert H. Spitzer
(74) *Attorney, Agent, or Firm*—Calfee, Halter & Griswold, LLP (57) ABSTRACT

An apparatus is disclosed for dehydrating gas in a system having control gas and supply gas. A first housing is fluidly connected to supply gas and a first membrane member is in the first housing flow path, with a plurality of tubes having interstitial spaces therebetween, each tube being more permeable to water vapor than to gas. Supply gas exiting the first membrane member is drier. Drier supply gas is metered to the first membrane member interstitial spaces, whereby dried supply gas sweeps water or water vapor from the first membrane member interstitial spaces to surrounding environment. A second housing similar to the first has a similar second membrane member therein and fluidly connected to control gas. Control gas exiting second membrane member is drier. Drier supply gas is also metered to second membrane member interstitial spaces, and sweeps water or water vapor from second member interstitial spaces through the second housing vent.

63 Claims, 6 Drawing Sheets

U.S. PATENT DOCUMENTS

| | | | | |
|---|---|---|---|---|
| 5,525,143 A | * | 6/1996 | Morgan et al. | 95/52 |
| 5,554,283 A | * | 9/1996 | Brinda et al. | 210/321.8 |
| 5,584,914 A | * | 12/1996 | Senoo et al. | 96/6 |
| 5,605,564 A | * | 2/1997 | Collins | 95/52 |
| 5,681,368 A | * | 10/1997 | Rahimzadeh | 95/19 |
| 5,779,897 A | * | 7/1998 | Kalthod et al. | 210/321.8 |
| 5,800,597 A | * | 9/1998 | Perrotta et al. | 96/9 |
| 5,837,033 A | * | 11/1998 | Giglia et al. | 95/45 |
| 5,851,267 A | * | 12/1998 | Schwartz | 96/7 |
| 5,885,329 A | * | 3/1999 | Hermann | 95/22 |
| 5,961,692 A | * | 10/1999 | Collins | 95/45 |
| 6,004,383 A | * | 12/1999 | Kuhnelt | 96/8 |
| 6,019,822 A | * | 2/2000 | Kanzawa et al. | 96/8 |
| 6,070,339 A | * | 6/2000 | Cunkelman | 34/79 |
| 6,087,029 A | * | 7/2000 | Golovin et al. | 429/27 |
| 6,126,724 A | * | 10/2000 | Martin et al. | 96/4 |
| 6,128,825 A | | 10/2000 | Cunkelman | |
| 6,210,464 B1 | * | 4/2001 | Nakanishi et al. | 95/52 |
| 6,296,683 B1 | * | 10/2001 | Koch | 95/23 |
| 6,346,142 B1 | * | 2/2002 | Jetter et al. | 96/9 |
| 6,358,300 B1 | | 3/2002 | Fornof et al. | |
| 6,370,887 B1 | * | 4/2002 | Hachimaki | 62/94 |

* cited by examiner

MEMBRANE GAS DEHYDRATING APPARATUS FOR GAS CONTROLLED AND POWERED SYSTEMS

BACKGROUND OF THE INVENTION

This invention relates to a gas dehydrating apparatus for gas controlled and powered systems, and more particularly to a membrane air dehydrating apparatus for use in pneumatically controlled and powered systems.

Compressed air systems are widely used to operate a number of devices, and find particular use in braking systems for commercial vehicles. These systems include an air compressor which compresses ambient air and charges a storage reservoir(s).

The air compressor is engine driven and sized to have a capacity to rapidly pressurize the reservoir(s) so that brakes are available as soon as possible after engine start, or for high duty cycles as would be required when descending winding mountain roads. Due to this, the air compressor has excess capacity during normal vehicle operation. To aid in fuel economy, the air compressor may be selectively decoupled (for example by a clutch) from the engine when the air pressure in the reservoir(s) is at a predetermined level. The control of the decoupling means is based upon reservoir pressure feedback.

Air dryers commonly employ a drying material or desiccant through which air passes to remove entrained moisture and limit potential problems stemming from moisture associated with brake system components. Moisture is adsorbed by the desiccant and removed from the compressed air before it is communicated to the storage reservoir. In these known systems, periodic or cyclic purging of the air dryers is desirable in order to purge or regenerate the desiccant.

International Publication No. WO 01/19657 discloses a trailer air dryer/moisture buffering system to separately protect devices that may not be protected by the tractor's air dryer. This trailer buffering system allows the trailer braking and trailer suspension systems to be associated with the trailer dryer system, thereby avoiding contamination, the introduction of foreign particles, leakage, and freeze-up of the pneumatic valves. The disclosed trailer buffering system simultaneously filters and dries wet air sent to the trailer. This trailer buffering system uses an active drying material which may act as a moisture buffer, adsorbing moisture from the air during wet air consumption. The active drying material then slowly releases the previously captured moisture in vapor phase during a purge cycle, thereby regenerating the desiccant.

This type of buffering system is not an active air dryer, meaning the buffering system does not actively expel moisture from the air. For the supply air, a purge cycle could be incorporated with appropriate timing. Such a system generally would be rather complex and may be cost prohibitive.

With regard to the control air in this desiccant-type buffering system, a purge cycle could not simply be incorporated since it would be highly undesirable to interrupt the flow of control air, even for a very short time. Further, pressure swing adsorption (PSA) may be less effective with control air because it may consistently remain at rather low pressures. As such, in order to incorporate a purge cycle, the control air system would need two separate desiccant members, one for use and the other for purging, with appropriate timing for switching between the two. This added complexity renders the system cost prohibitive.

As may readily be appreciated, it is desirable to provide a gas dehydrating apparatus for gas controlled and powered systems, for example pneumatically controlled and powered braking systems for truck trailers, which continuously purges moisture removed from the control and supply gas. It is also desirable to provide such an apparatus which is relatively simple to manufacture and does not need electronically controlled timing and complex valving. Still further, it is desirable to provide such an apparatus which advantageously utilizes higher pressure supply gas to sweep extracted moisture from lower pressure control gas.

SUMMARY OF THE INVENTION

The present invention provides a method and apparatus for continuously removing moisture from a compressed air system. In one embodiment, the apparatus includes two membrane dryers acting in concert to dry a supply and a control gas for a pneumatically controlled and powered braking system.

In one specific embodiment, the air dryer system has a first housing having an inlet and an outlet and a flow path therebetween, and connected to a supply gas. A first membrane member is disposed within the first housing and in the flow path, and includes a plurality of tubes with interstitial spaces therebetween, each tube being more permeable to water vapor than to air. Supply gas passes through the first membrane member, thereby becoming substantially dehydrated. A portion of the dehydrated supply gas is channeled to the first membrane member interstitial spaces, whereby the dehydrated supply gas sweeps water and water vapor from the first membrane member interstitial spaces to the surrounding environment. A second housing has an inlet and an outlet and a flow path therebetween, and connected to a control gas. A second membrane member is disposed within the second housing and in the second housing flow path, and includes a plurality of tubes with interstitial spaces therebetween, each tube being more permeable to water vapor than to air. Control gas passes through the second membrane member, thereby becoming substantially dehydrated. A second portion of the dehydrated supply gas is directed from the first housing outlet gas to the second membrane member interstitial spaces, whereby the dehydrated supply gas sweeps water and water vapor from the second membrane member interstitial spaces to the environment.

Another aspect of the present invention is a method of drying compressed air used in a pneumatically controlled and powered braking system. In one embodiment, the method employs two membrane dryers that receive and dehydrate compressed air in a supply gas stream and a control gas stream.

BRIEF DESCRIPTION OF THE DRAWINGS

In the accompanying drawings, which are incorporated in and constitute a part of the specification, embodiments of the invention are illustrated, which together with the general description of the invention given above, and the detailed description given below, serve to example the principles of this invention.

DETAILED DESCRIPTION OF THE PREFERRED EMBODIMENTS

Figure 1:
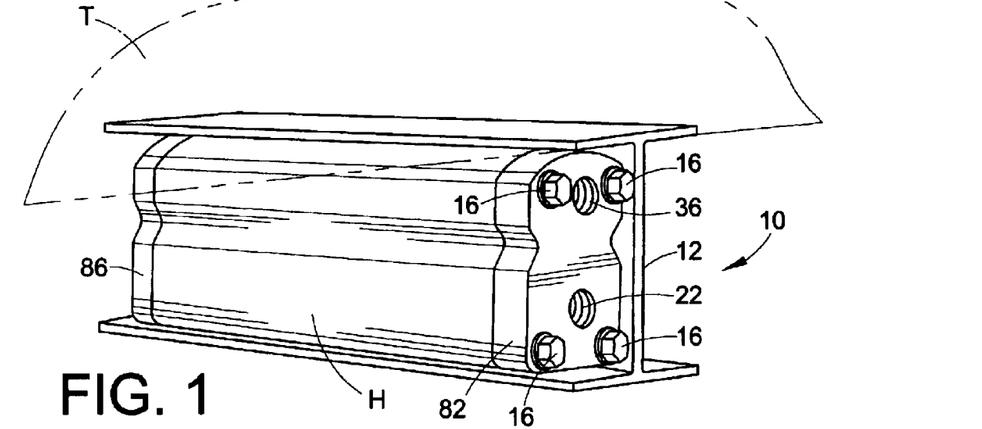
FIG. 1 is a perspective view showing the apparatus of the present invention mounted on a trailer cross member, with the trailer in phantom and cut away.

FIG. 1 illustrates the membrane gas dehydrating apparatus of the present invention, generally referenced as 10. Apparatus 10 is for use in a gas controlled and powered system having a control gas and a supply gas. The apparatus 10 is suitable for use in the dehydration of water-wet gases, including, but not limited to, compressed air, methane, hydrogen, helium, and carbon dioxide. The present invention may be used with any vehicle having air brakes or air powered accessories, including, but not limited to trailers, dollies, towed construction equipment, towed earth moving equipment, and towed mining equipment.

The present invention may find particular use for pneumatically powered and controlled braking systems in heavy vehicles such as, for example, truck tractors or truck trailers. Such systems have two independent air lines: a supply air line and a control air line. The supply line carries high pressure air that powers the brakes, and the control line carries a signal from the brake pedal valve.

As shown in FIG. 1, the apparatus 10 is typically mounted horizontally on a trailer T (shown in phantom) cross member 12 upstream from the trailer reservoir (not shown). Apparatus 10 may optionally in other mounting arrangements, such as disposed between two or more mounting plates (not shown) via appropriate fastening means, such as bolts 16. In one embodiment, end caps 82, 82', 82" and 86, 86', 86" (FIGS. 1, 11 and 14) are fastened to housing H via appropriate fastening means, such as the bolts 16. It should be appreciated by one skilled in the art that apparatus 10 may be mounted in any suitable area on the tractor or the trailer T, and by any suitable means.

Figure 3:
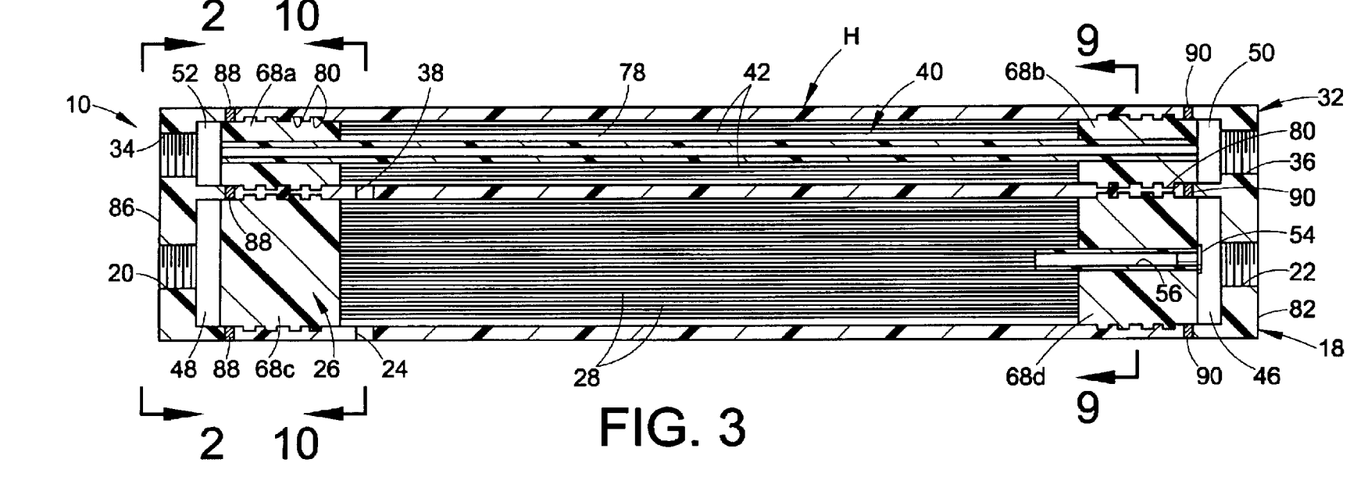
FIG. 3 is a front cross sectional view of the present invention.

FIG. 3 shows the apparatus 10 having a first housing 18 having a vent 24, an inlet 20, an outlet 22 and a flow path between the inlet 20 and outlet 22. Although the flow path shown is generally in a horizontal configuration, it is to be understood by one skilled in the art that the flow path may be U-shaped, tortuous, or any other suitable configuration as desired or necessitated by a particular end use or consumer. Both the inlet 20 and outlet 22 are adapted to be connected to the supply gas by any suitable means. As shown in the Figures, the supply inlet port 20 and supply outlet port 22 may be threaded; however, ports 20 and 22 may also be configured for quick connect couplings.

Figure 9:
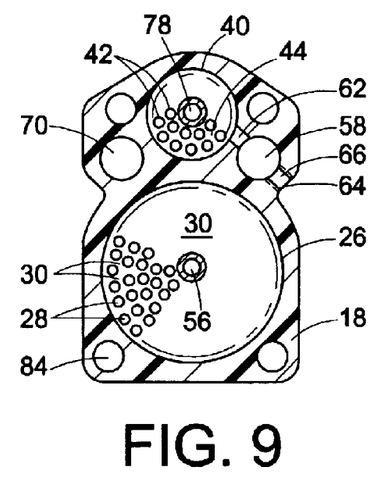
FIG. 9 is a cross sectional view of the first and second membrane member within a unitary housing at the control sweep entry.

FIG. 9 illustrates a first membrane member 26 disposed within the first housing 18 and in the flow path, and includes a plurality of tubes 28 with interstitial spaces 30 therebetween. Each tube 28 is more permeable to water vapor than to gas, wherein after the supply gas has passed through the first membrane member 26, the supply gas becomes substantially dehydrated supply gas. Without being bound to any theory, it is believed that partial pressure forces water vapor (but not the other components of the gas itself) through the tubes 28 and into the interstitial spaces 30. In accordance with this theory, water vapor would pass through the membrane tubes toward the interstitial spaces 30 at any area having permeability therein.

It should be understood that any membrane adapted to remove water vapor entrained within a gas may be suitable for use within the present invention. Several membrane dryers are commercially available, including, for example, CACTUS Membrane Air Dryers from Permea, an Air Products Company in St. Louis, Mo.; PRISM Natural Gas Dehydration Systems from Air Products A/S in Kristiansand S, Norway; and STEALTH Membrane Air Dryers from Porous Media in St. Paul, Minn.

Referring again to FIG. 3, the apparatus 10 further includes means, proximate the first housing outlet 22, for channeling a first predetermined portion of substantially dehydrated supply gas to the interstitial spaces 30 of the first membrane member 26, whereby the substantially dehydrated supply gas first portion sweeps water and water vapor from the interstitial spaces 30 of the first membrane member 26 to atmosphere, to the surrounding environment, or to another designated location through the first housing vent 24. This is described in further detail below.

A second housing 32 has a vent 38, an inlet 34, an outlet 36 and a flow path between the inlet 34 and the outlet 36. As with first housing 18, although the second housing flow path shown is generally in a horizontal configuration, it is to be understood that the flow path may be U-shaped, tortuous, or any other suitable configuration as desired or necessitated by a particular end use or consumer. Both the inlet 34 and outlet 36 are adapted to be connected to the control gas by any suitable means. As shown in the Figures, the control inlet port 34 and control outlet port 36 may be threaded; however, ports 34 and 36 may also be configured for quick connect fittings or other suitable fittings. It should be understood that ports 20, 22, 34 and 36 may be configured similarly to one another, or each differently from the other, or some combination thereof.

A second membrane member 40 is disposed within the second housing 32 and in the second housing flow path, and includes a plurality of tubes 42 having interstitial spaces 44 therebetween. Each tube 42 is permeable to water vapor than to the gas, wherein after the control gas has passed through the second membrane member 40, the control gas becomes substantially dehydrated control gas. It should be understood that the tubes 42 function as do the tubes 28 of the first membrane member. Further, any of the non-limitative examples of suitable membranes listed hereinabove are also contemplated as being suitable for use as the second membrane member 40. It should be further understood that the first membrane member 26 may be formed from the same or similar materials as the second membrane member 40 or membrane members 26, 40 may be formed from different materials. It should be further understood that tubes 28 and 42 can be formed in a variety of shapes and configurations, and therefore should not be limited to that which is shown in the illustrative embodiments.

Apparatus 10 of the present invention further includes means, proximate the first housing outlet 22, for directing a second predetermined portion of substantially dehydrated supply gas to the interstitial spaces 44 of the second membrane member 40, whereby the substantially dehydrated supply gas second portion sweeps water and water vapor from the interstitial spaces 44 of the second membrane member 40 to atmosphere, to the surrounding, or to another designated location through the second housing vent 38. In one embodiment, the second housing vent 38 is in fluid communication (via any suitable means) with the interstitial spaces 30 of the first membrane member 26, whereby the water and water vapor swept from the interstitial spaces 44 of the second membrane member 40 is swept out the first housing vent 24.

Tubes 28 and 42 may be formed with any geometric cross sectional configuration as desired or necessitated by a particular end use, and from any suitable material desired, provided tubes 28 and 42 function to at least partially dehydrate gas(es) flowing therethrough. Further, in the one embodiment, each of the plurality of tubes 28 and 42 in each of the first 26 and second 40 membrane members is a hollow fiber formed from a suitably semi-permeable material.

Materials suitable to achieve the desired membrane morphology include those polymeric materials typically known for use in making permeable membranes exhibiting the specified morphology. Examples of the polymeric materials from which the hollow fibers are formed include, but are not limited to, polysulfones, polyethersulfones, polyarylsulfones, polycarbonates, nylons, polyimides, polyvinylidenedifluorides, polyvinylidenedichlorides, cellulosics, polyacrylonitriles, and others known to make permeable membranes, used alone or in combination. Inorganic materials capable of forming an appropriate membrane structure may also be suitable. Examples of such inorganic materials include, but are not limited to, ANOPORE® membranes, which are anodic aluminum oxide flat sheet membranes. ANOPORE® membranes are commercially available from Whatman, Inc. in Clifton, N.J. Other suitable flat sheet membranes may also be used. The desired morphology may be achieved with the suggested materials by a number of processing and formation techniques, among them phase inversion, thermal induced phase separation (TIPS), tracketching, or other known or envisioned means of fabricating permeable membranes with appropriate selective permeability. Further suitable membranes are disclosed in U.S. Pat. Nos. 5,525,143 and 6,083,297, each of which is incorporated herein by reference in its entirety.

Figure 10:
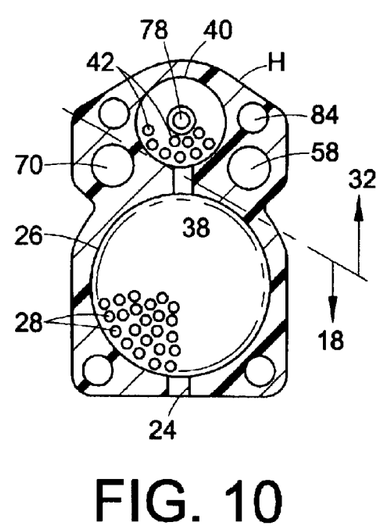
FIG. 10 is a cross sectional view similar to that of FIG. 9, but showing one embodiment of the control sweep exit and the supply sweep exit.

Although the first housing 18 and the second housing 32 may comprise two separate housings, in one embodiment, first housing 18 and second housing 32 comprise two portions of a single unitary housing H, as best seen in FIG. 10. Housings 18 and 32 may be formed from any suitable material. In one embodiment, the housings are formed from at least one polymeric material by extruding, casting, or any other suitable method. Many suitable polymeric materials may be used, including, but not limited to, polyvinylchloride (PVC), acetal, polybutyleneterephthalate (PBT), polyethyleneterephthalate (PET), polyetherimides, polyphenylene sulfides, fiber (including but not limited to glass fibers) reinforced compositions of any of the above materials (e.g. glass filled acetals), and mixtures thereof. Housings 18 and 32 may also be formed from at least one metallic material, such, as for example, aluminum, by extruding, casting, or any other suitable method. This will be discussed further hereinbelow in relation to FIGS. 11 and 12. Other suitable metallic materials include, but are not limited to, carbon steel, for example, grades 1016, 1008, 1020, 4340 and the like, heat resistant carbon steel alloys, for example, grades A-286, A-556, A-800 and the like, beryllium-copper alloys, magnesium alloys, lead alloys, nickel-titanium alloys, nickel-based alloys, copper, copper alloys, titanium alloys, zinc alloys, cobalt, and mixtures thereof. In other embodiments, the housings can be formed of a combination of polymeric materials and metallic materials, such as those mentioned above.

A plenum 46 may be disposed in the flow path between the first membrane member 26 and the first housing outlet 22, as best seen in FIG. 3. Further, a plenum 48 may be disposed in the flow path between the first housing inlet 20 and the first membrane member 26. Similarly, second housing 32 may have defined therein plenums 50 and 52.

The channeling means discussed above may be any structure suitable to channel the second predetermined portion of substantially dehydrated supply gas to the interstitial spaces 30 of the first member 26. In one embodiment, the channeling means includes a metering orifice 54 in fluid communication (via any suitable means, such as bore 56) with plenum 46 and the interstitial spaces 30 of the first member 26.

Figure 4:
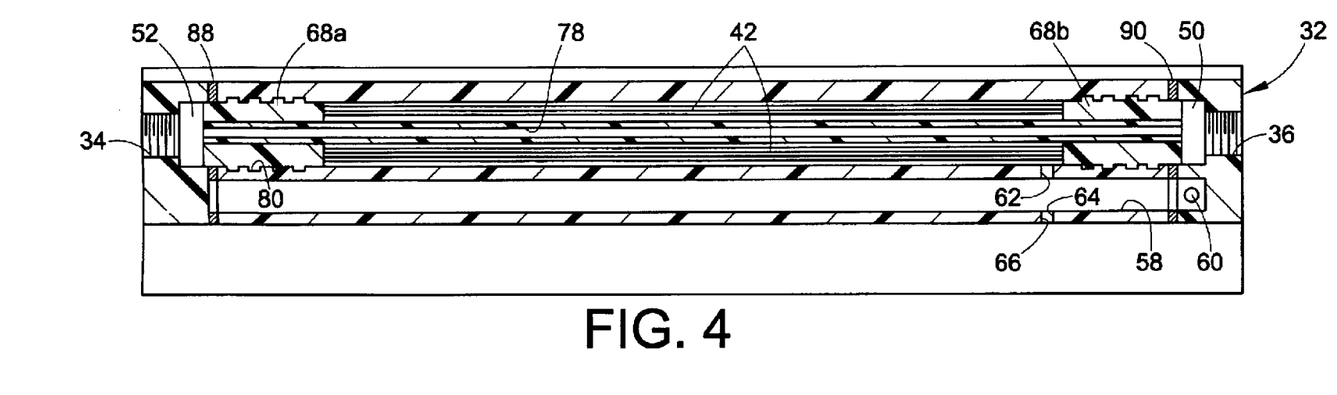
FIG. 4 is a cross sectional view taken on line 4—4 of FIG. 2 and showing sweep flow for the control gas membrane member.

FIG. 4 illustrates the second housing 32 may also include a flow channel 58 in fluid communication with the interstitial spaces 44 of the second membrane member 40. The directing means discussed above may be any structure suitable to direct the second predetermined portion of substantially dehydrated supply gas to the interstitial spaces 44 of the second membrane member 40. In one embodiment, the directing means includes a metering orifice 60 in fluid communication with plenum 46 and the flow channel 58. Substantially dehydrated supply air flows into plenum 46, then through metering orifice 60, into flow channel 58 and then into the interstitial spaces 44 of the second membrane member 40 via bore 62. In one embodiment, bore 64 provides access to bore 62 during manufacture of the housing and remains plugged via cap member 66. In order to obviate drawbacks associated with differing coefficients of thermal expansion, cap member 66 is preferably formed from the same, or similar, material from which second housing 32 is formed.

The membrane members 26 and 40 may be configured in any suitable manner so as to retain removed moisture on the permeate side (interstitial spaces 30 and 44) of the tubes 28 and 42 until swept out vents 24 and 38 by purging. In one embodiment, both the first membrane member 26 and the second membrane member 40 include two opposed polymeric tubesheets 68a, 68b, 68c, 68d. As illustrated in FIG. 3, one tubesheet 68 is adjacent to the respective housing inlet 34 and 20, and the other adjacent to the respective housing outlet 36 and 22. The tubesheets 68 orient the respective plurality of tubes 42 and 28 therein and allow fluid communication between the tubes 42 and 28 and the respective inlet 34 and 20 and outlet 36 and 22, while disallowing fluid communication between the respective interstitial spaces 44 and 30 and the respective inlet 34 and 20 and outlet 36 and 22.

The tubesheets 68 may be formed in the following manner, however it should be understood that this method is exemplary and is not intended to be limiting. The ends of the hollow fibers 28 and 42 may be sealed by dipping the ends into a hot melt adhesive or wax to prevent the tubesheet material from entering tubes 28 and 42. Fiber bundles may be formed in any suitable manner, such as by assembling a plurality of fibers into a desired shape/configuration, or by helically winding a long fiber into the desired shape/configuration. The sealed fiber bundles 28 and 42 may be placed into a potting mold or a casting cup. A suitable tubesheet material is introduced into the mold, and then the bundles are potted, such as by gravity potting, centrifugal potting, and the like, to form the epoxy tubesheets 68. It should be understood that the tubesheet material may be selected from any suitable material, including, but not limited to epoxies, polyurethanes, polyesters, and mixtures thereof. Grooves 80 may be machined, or otherwise placed, on the inside surfaces of the first 18 and second 32 housings to facilitate adhesion to the tubesheet material to the housings.

The thus formed first 26 and second 40 membrane members/bundles include hundreds of hollow tubes/fibers 28 and 42 embedded in the potting material, making up the tubesheets 68. The ends of the hollow fibers are open at one end to allow pressurized air to flow through the fiber bores to the other end. The outside of the fibers is open to the atmosphere via interstitial spaces 30 and 44 and vents 24 and 38, thus the fibers hold the full air pressure across the fiber wall thickness. The tubes/fibers 28 and 42 may be of any suitable shape, configuration and size, however, in one embodiment, the tubes/fibers 28 and 42 generally have a diameter of about 0.5 mm with bores of about 0.25 mm or smaller.

The tubes 28 and 42 may be engineered to be permeable to water vapor, but to have very low permeability to the other components of air. Pressure differential pushes water vapor through the tube walls to the shell/permeate side (30 and 44) of the tubes 28 and 42 from where it is expelled from the apparatus 10. Drier air then emerges from the tubes 28 and 42 adjacent the outlet 22 and 36.

Approximately 15% of the substantially drier supply gas may be used in order to expel water and water vapor from the supply membrane member 26. Approximately 15% of the substantially drier supply gas may be used in order to expel water and water vapor from the control membrane member 40.

Membrane members 26 and 40 may be formed in any suitable or desired shape and with any suitable or desired geometric cross section. In one embodiment, each of the first 26 and second 40 membrane members is generally cylindrical and has a generally substantially circular cross section.

The supply gas is preferably at an operating pressure ranging between about 60 psig and about 140 psig; and more preferably, the supply gas is at an operating pressure ranging between about 100 psig and about 140 psig.

The control gas is preferably at an operating pressure ranging between 0 psig and about 140 psig; and more preferably, the control gas is at an operating pressure ranging between 0 psig and about 20 psig.

Figure 5:
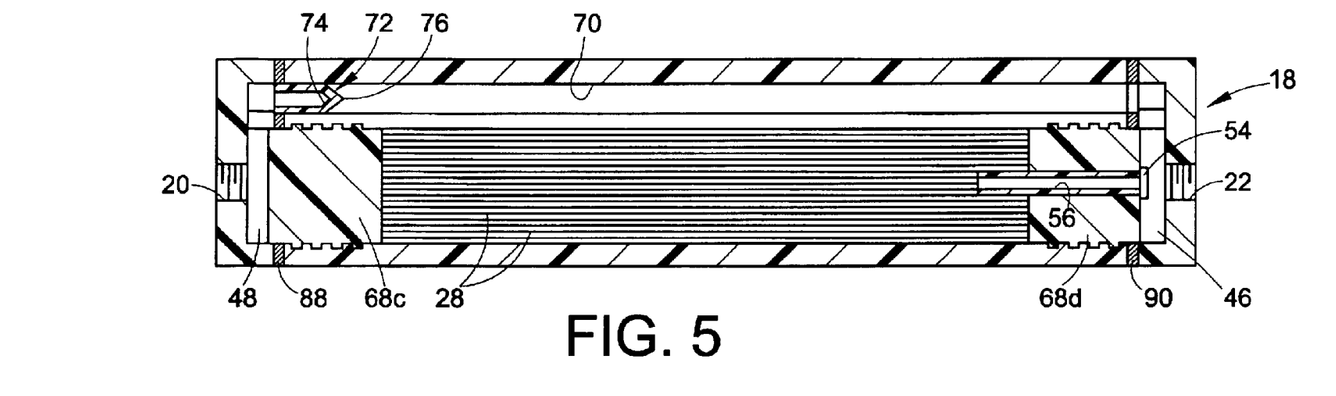
FIG. 5 is a cross sectional view taken on line 5—5 of FIG. 2 and showing the supply gas membrane member bypass.

In one embodiment a redundant path for gas is provided in the event that flow through the tubes 28 and 42 is restricted. In another embodiment, the first housing 18 may further include a means for the supply gas to bypass the first membrane member 26; and the second housing 32 may further include a means for the control gas to bypass the second membrane member 40. The supply gas bypass means may comprise any suitable means; however, in one embodiment, as best seen in FIG. 5, the supply gas bypass means includes a bypass channel 70 defined in the first housing 18 and in the flow path between the first housing inlet 20 and outlet 22. A normally closed one-way flow valve 72 is operatively disposed in the bypass channel 70, the valve having a flow entry side 74 and a flow exit side 76, wherein the valve 72 opens at a predetermined pressure difference between the entry side 74 and the exit side 76. The pressure difference may be any suitable pressure difference; however, in one embodiment, the valve 72 opens when the pressure difference reaches 5 psi. Valve 72 is shown in FIG. 5 to be a duckbill valve; however, any suitable valve may be used, such as, for example, reed valves, flapper valves, or poppet valves. The control gas bypass means may comprise any suitable means, including, but not limited to, a valved or a continuous bypass. The valved bypass would provide relief at a specific differential pressure (as with the supply gas bypass). In one embodiment, the control gas bypass means includes a bypass tube 78 defined in the second membrane member 40, as shown in FIGS. 3 and 4. Bypass tube 78 is in fluid communication with the second housing inlet 34 and outlet 36. The second membrane member 40 is sized for a low pressure drop and an excessive drying capacity. In the continuous bypass embodiment, bypass tube 78 allows a fraction of the gas to continuously bypass the second membrane member 40, and has sufficient capacity for the whole control flow in the unlikely event that the second membrane member 40 should become partially or completely plugged.

The term "around" as used herein regarding supply/control gas bypassing "around" a membrane member is not intended to denote a geometrical or physical orientation. Rather, it is intended to mean that the supply/control gas does not go through the tubes 28 and 42 in the respective membrane member 26 and 40. For example, the control bypass tube 78 actually goes physically "through" the membrane member 40; however, the control gas bypass flow portion goes "around" the membrane member 40 by not entering tubes 42.

Figure 2:
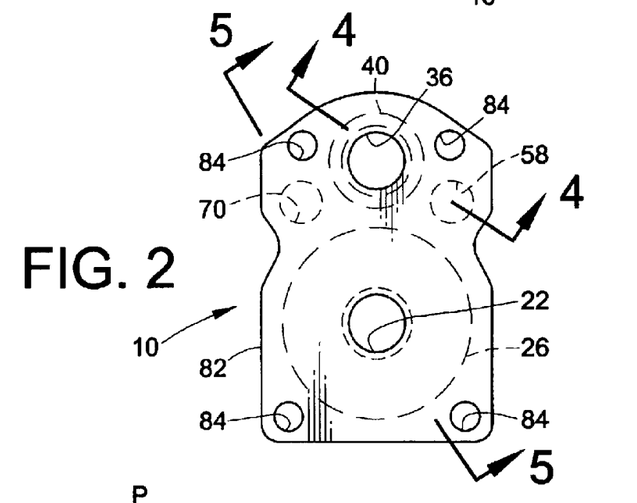
FIG. 2 is a side view of the apparatus of the present invention.

FIG. 2 shows a side view of the apparatus 10 of the present invention. The outside of outlet end cap 82 is shown, with attachment bores 84 for attaching to the housing H or to an optional mounting plate (not shown). Although four bores 84 are shown, any number of bores 84 may be used as necessitated or desired.

Figure 6:
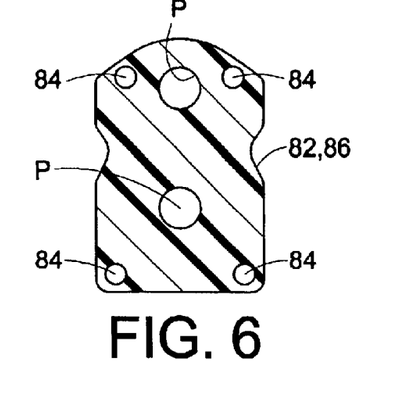
FIG. 6 is a cross sectional view of an end cap extrusion before finishing.
Figure 7:
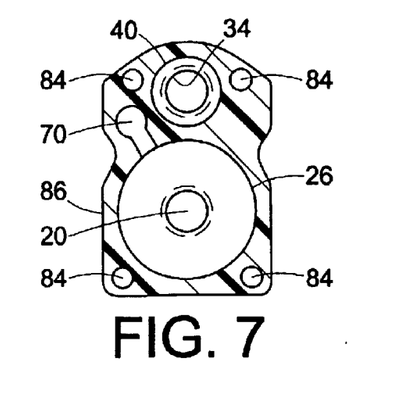
FIG. 7 is a cross sectional view of the finished inlet end cap.

FIG. 6 shows an end cap extrusion before finishing. Port bores P are defined in end caps 82 and 86 for suitable operative connection to the respective inlet or outlet end of the supply or control gas. FIG. 7 shows a finished inlet end cap 86, and also shows the supply bypass channel 70. As best shown in FIG. 3, suitable seals 88 and 90 may be disposed between inlet end cap 86 and outlet end cap 82 and housing H. Seals 88 and 90 may be formed from any suitable material, including, but not limited to, nitrile rubber coated aluminum, elastomers, or mixtures thereof. It is to be understood that end caps 82, 82', 82", 86, 86', 86" are attached (removably or permanently) to housing H.

Figure 8:
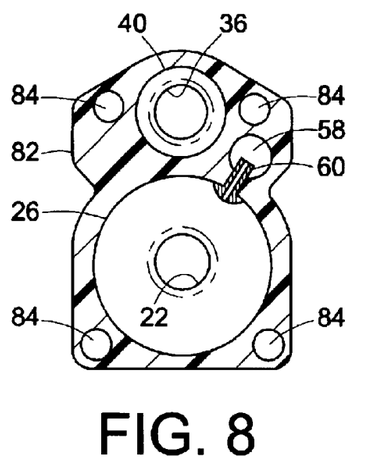
FIG. 8 is a cross sectional view of the finished outlet end cap.

FIG. 8 shows a finished outlet end cap 82, as well as the control sweep flow channel 58 and control sweep metering orifice 60. FIG. 10 shows one embodiment of the control sweep vent 38 and the supply sweep vent 24.

Figure 11:
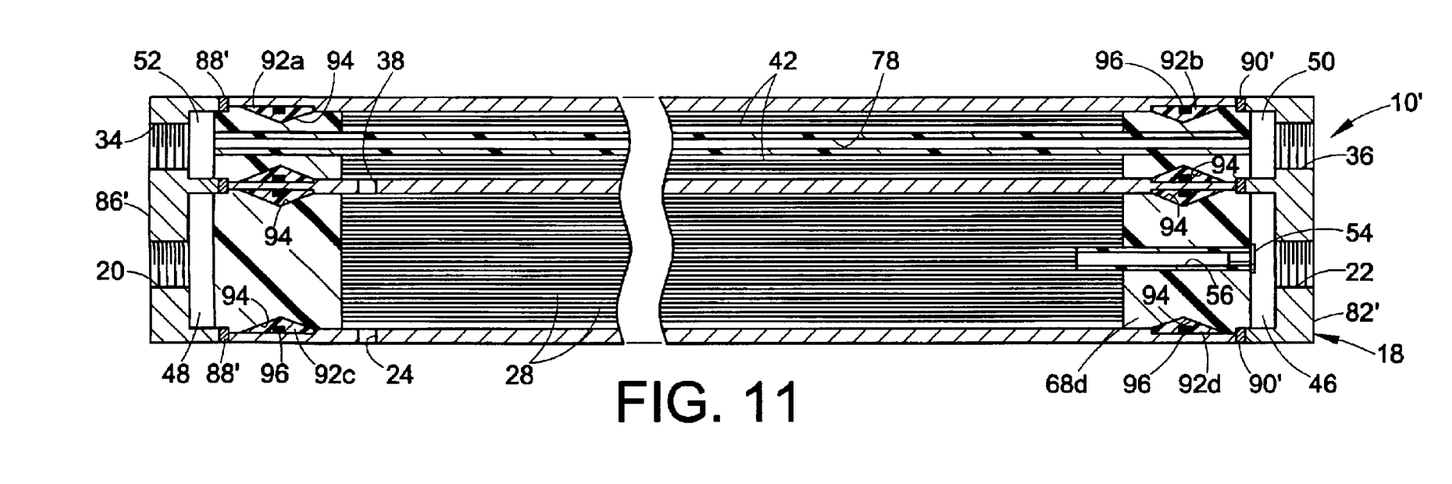
FIG. 11 is a front, partially cutaway, cross sectional view of an alternate embodiment of the present invention.

FIG. 11, illustrates an alternate embodiment of the apparatus 10' of the present invention. Apparatus 10' includes the features as described hereinabove with respect to the first embodiment of the apparatus 10, with the following exceptions. Housing H of apparatus 10' is formed from an extrusion of a suitable metallic material, such as aluminum. Due to differing coefficients of thermal expansion of metal and the potting material for the tubesheets 68 the grooves 80 may not be sufficient for aiding in adhesion of tubesheets 68 to housing H during thermal cycling.

Figure 12:
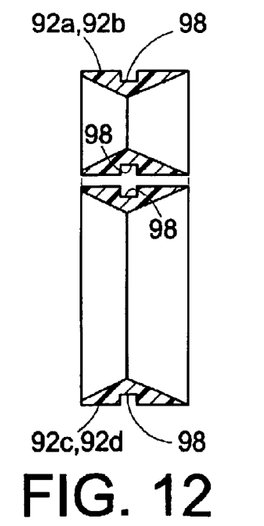
FIG. 12 is a cross sectional view similar to that of FIG. 11, but only showing one of the seals around the first membrane member and one of the seals around the second membrane member.

FIG. 12 illustrates suitably rigid polymeric O-ring seal members 92a, 92b, 92c, and 92d disposed around tubesheets 68a, 68b, 68c, and 68d, respectively, to provide a seal which may be tolerant of thermal shock. Seal members 92 may be formed from any suitable material, including, but not limited to, polyethylenes, polypropylenes, polyvinylchloride (PVC), acetal, polybutyleneterephthalate (PBT), polyethyleneterephthalate (PET), polyetherimides, polyphenylene sulfides, fiber (including but not limited to glass fibers) reinforced compositions of any of the above materials (e.g. glass filled acetals), and mixtures thereof.

The tubesheets 68 of FIG. 11 may differ slightly from the tubesheets of the first embodiment, in that the tubesheets of FIG. 11 each may have an annular groove 94 therein complementarily shaped to the mate with the seal members 92 to aid in preventing inadvertent lateral movement of the seal members 92. Seal members 92 further may carry elastomeric O-rings 96 receivable within annular channels 98 defined in seal members 92 (as best seen in FIG. 12) for additional sealing capability.

The present invention further includes a method for dehydrating gas in a gas controlled and powered system having a control gas and a supply gas. The method includes the step of passing supply gas through a first membrane member 26 comprising a plurality of tubes 28 having interstitial spaces 30 therebetween, each tube 28 being more permeable to water vapor than to the gas air. After the supply gas has passed through the first membrane member 26, the supply gas becomes substantially dehydrated supply gas. The method further includes the step of channeling a first predetermined portion of substantially dehydrated supply gas to the interstitial spaces 30 of the first membrane member 26, whereby the substantially dehydrated supply gas portion sweeps water and water vapor from the interstitial spaces 30 of the first membrane member 26 to atmosphere, to the surrounding environment, or to another designated location.

Control gas is passed through a second membrane member 40 comprising a plurality of tubes 42 having interstitial spaces 44 therebetween, each tube 42 being more permeable to water vapor than to the gas. After the control gas has passed through the second membrane member 40, the control gas becomes substantially dehydrated control gas.

The method further includes the step of directing a second predetermined portion of substantially dehydrated supply gas to the interstitial spaces 44 of the second membrane member 40, whereby the substantially dehydrated supply gas portion sweeps water and water vapor from the interstitial spaces 44 of the second membrane member 40.

The method of the present invention may further optionally include the step of selectively bypassing supply gas around the first membrane member 26 under predetermined conditions. Further, the method of the present invention may optionally include the step of bypassing control gas around the second membrane member 40, either selectively under predetermined conditions or continuously.

FIGS. 13–19 illustrate a further alternate embodiment 10" of the present invention. It should be understood that any of the embodiments 10, 10', 10" shown herein may be used as OEM equipment or as after market replacement or retrofit equipment. However, it is believed that the embodiment of FIGS. 13–19, namely embodiment 10", may be particularly suitable for retrofit applications. The supply or control gas lines may be cut at any area and operatively connected to apparatus 10, 10', 10" as desired or suitable. Tubesheets 68 are then formed as set forth above. Housing H' may also be formed to fit the desired size or shape; the configuration of housing H' is exemplary and may be modified as desired.

The elements of FIGS. 13–19 having the same numbers are as described in the embodiments hereinabove (including illustrative and alternate embodiments set forth above).

Housing H' may include a T-shaped longitudinal mounting slot 100 defined therein, as best seen in FIGS. 15–19, that is adapted to slidingly receive a substantially complementarily shaped T-member at a suitable area on a vehicle, for example a tractor or a trailer.

Figure 13:
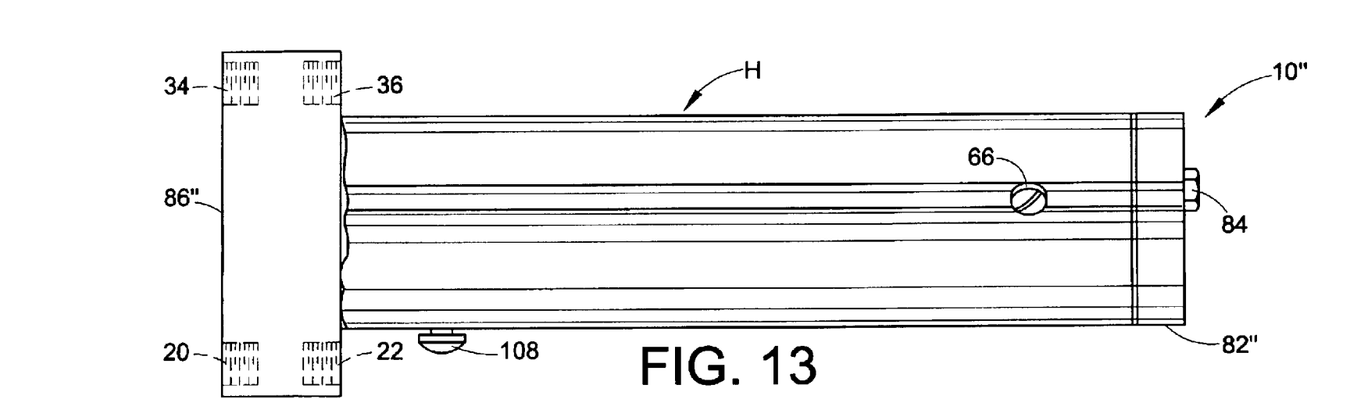
FIG. 13 is a semi-schematic front view of a further alternate embodiment of the present invention.
Figure 14:
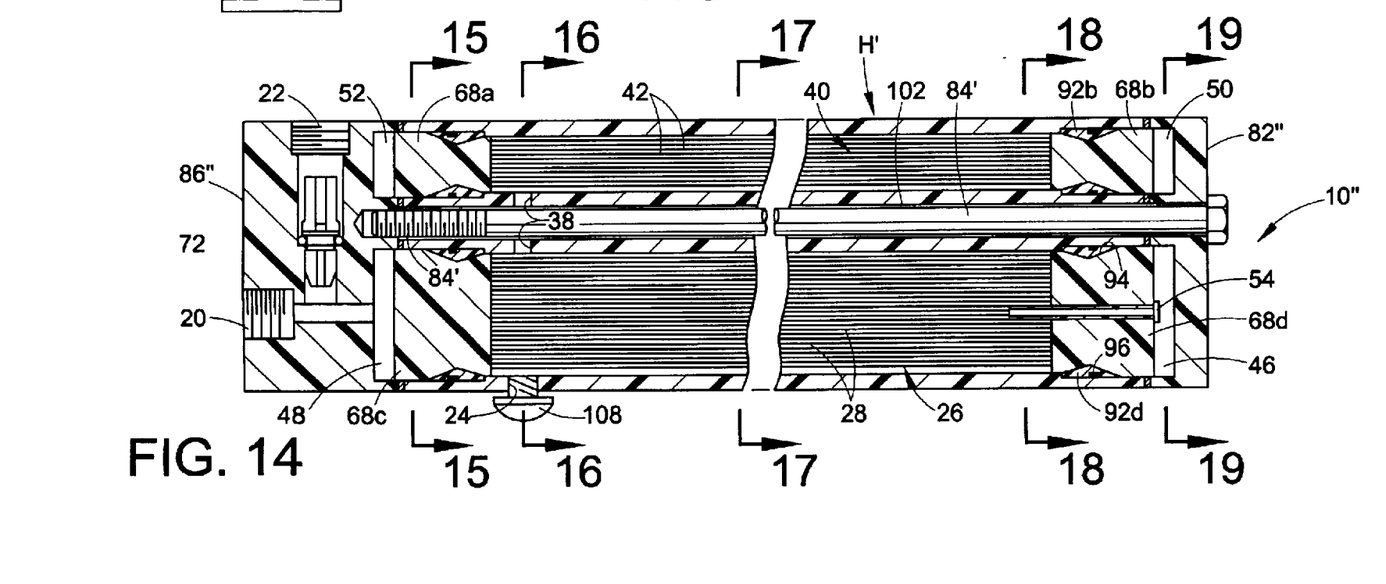
FIG. 14 is an enlarged, partially cutaway cross sectional view of FIG. 13.
Figure 15:
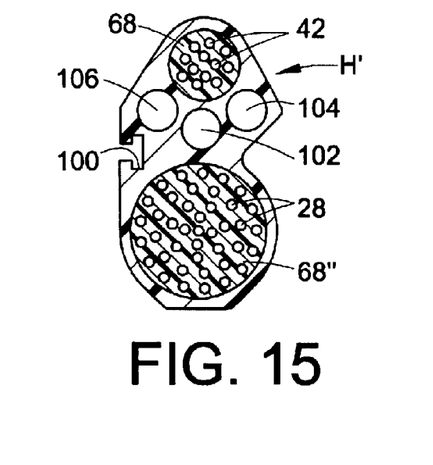
FIG. 15 is a cross sectional view taken on line 15—15 of FIG. 14.
Figure 16:
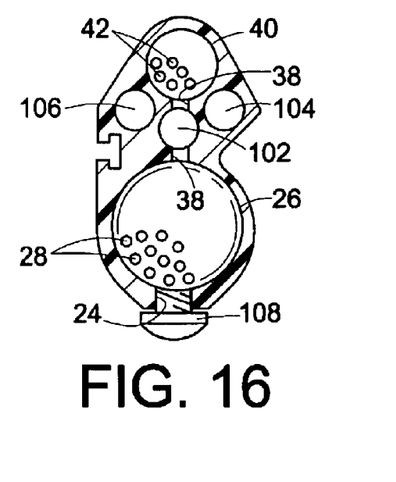
FIG. 16 is a cross sectional view taken on line 16—16 of FIG. 14, showing the vents.
Figure 17:
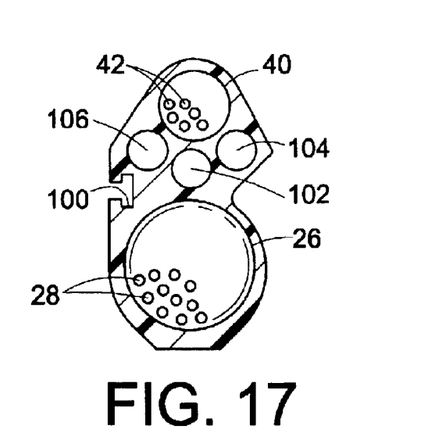
FIG. 17 is a cross sectional view taken on line 17—17 of FIG. 14.
Figure 18:
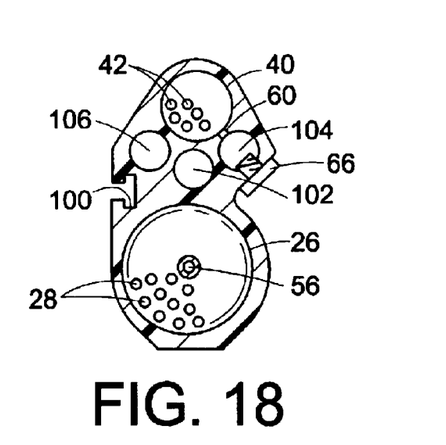
FIG. 18 is a cross sectional view taken on line 18—18 of FIG. 14, showing the control sweep entry.
Figure 19:
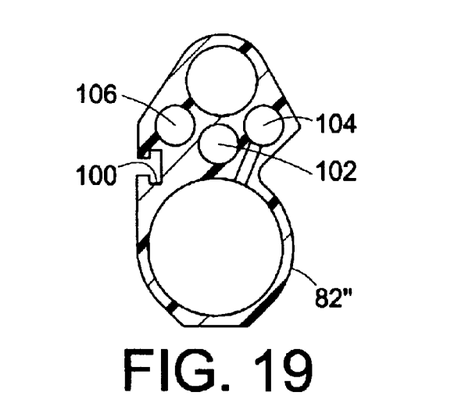
FIG. 19 is a cross sectional view taken on line 19—19 of FIG. 14, showing the delivery end cap.

FIG. 13 illustrates each of the control inlet 34, outlet 36, supply inlet 20 and outlet 22 (schematically shown) in inlet end cap 86b. In FIG. 14, only the supply inlet 20 is shown, and is shown as a push-to-connect fitting cartridge. However, any suitable fitting configurations may be used and the remaining ports 22, 34, and 36 may be similarly configured, or differently configured. Optional normally closed one way valve 72 operates as described above to provide an optional bypass to supply outlet 22 (outlet 22 is not shown in FIG. 14, but flow toward outlet 22 is designated by an arrow toward it). Further, control gas may also optionally have a valve 72 as shown in FIG. 14 to provide an optional valved bypass (as opposed to the continuous bypass described in FIGS. 1–12 above).

A retention bolt channel 102 is defined in housing H' and carries connection bolt 84', which is threadingly received in inlet end cap 86". Retention bolt channel 102 also provides a conduit (if vent 38 does not vent directly to the surrounding environment) between vent 38 and vent 24. A supply return channel 104 and a control return channel 106 are defined in the housing H' (see FIGS. 15–19).

An optional vent cap 108 may be pressed or threadingly inserted into vent 24 to aid in preventing water or debris from entering apparatus 10, 10', or 10", while allowing the swept water and water vapor to exit the apparatus.

Apparatus 10" may be particularly advantageous in that it may be easily serviceable with the removal of one bolt 84'. Delivery end cap 82" is then removed, and membrane members 26 and 40 may be removed and replaced without disturbing the inlet end cap 86" mount, and without disturbing the connections of the supply gas inlet and outlet or of the control gas inlet and outlet.

It is preferred that the embodiment of FIGS. 13–19 not have grooves 80 (in order to facilitate removal and replacement), but rather tubesheets 68 and seal members 92 as shown in FIG. 11. However, tubesheets 68 and grooves 80 as shown in FIG. 3 may also be used in the embodiment of FIGS. 13–19.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:
1. A method for dehydrating gas in a gas controlled and powered system having a control gas and a supply gas, the method comprising the steps of:
passing supply gas through a first membrane member comprising a plurality of tubes having interstitial spaces therebetween, wherein after the supply gas has passed through the first membrane member, the supply gas becomes substantially dehydrated supply gas;
channeling a first predetermined portion of substantially dehydrated supply gas to the first membrane member interstitial spaces, whereby the substantially dehydrated supply gas portion sweeps at least one of water and water vapor from the first membrane member interstitial spaces to the surrounding environment;
passing control gas through a second membrane member comprising a plurality of tubes having interstitial spaces therebetween, wherein after the control gas has passed through the second membrane member, the control gas becomes substantially dehydrated control gas;
directing a second predetermined portion of substantially dehydrated supply gas to the second membrane member interstitial spaces, whereby the substantially dehydrated supply gas portion sweeps at least one of water and water vapor from the second membrane member interstitial spaces.

2. The method of claim 1, wherein each of the plurality of tubes of said first and second membrane members are more permeable to water vapor than to gas.

3. The method of claim 1, wherein each of the plurality of tubes in each of the first and second membrane members is a hollow fiber formed from a permeable material.

4. The method of claim 3, wherein the hollow fibers are formed from at least one of polysulfones, polyethersulfones, polyarylsulfones, polycarbonates, nylons, polyimides, polyvinylidenedifluorides, polyvinylidenedichlorides, cellulosics, polyacrylonitriles, and mixtures thereof.

5. The method of claim 1, wherein each of the first and second membrane members is formed from anodic aluminum oxide flat sheet membranes.

6. The method of claim 1, wherein the supply gas has an operating pressure ranging between about 60 psig and about 140 psig.

7. The method of claim 1, wherein the control gas is at an operating pressure ranging between 0 psig and about 140 psig.

8. The method of claim 1, further comprising the step of selectively bypassing supply gas around the first membrane member.

9. The method of claim 1, further comprising the step of bypassing control gas around the second membrane member.

10. The method of claim 1, wherein the at least one of water and water vapor swept from the second membrane member interstitial spaces is in fluid communication with the first membrane member interstitial spaces, whereby the at least one of water and water vapor swept from the second membrane member interstitial spaces is swept out with the at least one of water and water vapor swept from the first membrane member interstitial spaces.

11. A method for drying at least two compressed air streams comprising the steps of:
supplying a first compressed air stream to a first membrane member;
passing said first compressed air stream through a act of tubes located in said first membrane member, wherein water vapor in said first compressed air stream permeates through said tubes of said first membrane member, thereby causing said first compressed air stream to dry as it passes through said tubes of said first membrane member;
supplying a second compressed air stream to a second membrane member;
passing said second compressed air stream through a set of tubes located in said second membrane member, wherein water vapor in said second compressed air stream permeates through said tubes of said second membrane member, thereby causing said second compressed air stream to dry as it passes through said tubes of said second membrane member;
portioning air from said first membrane member into at least three portions of dried air;
decompressing a first portion of said portions of dried air and delivering said first portion of said portions of dried air to a flow channel located about said tubes of said first membrane member;
decompressing a second portion of said portions of dried air and delivering said second portion of said portions of dried air to a flow channel located about said tubes of said second membrane member; and
delivering a third portion of said portions of dried air to components downstream from said first membrane member.

12. An apparatus for dehydrating gas comprising:
a first membrane member comprising a plurality of tubes having interstitial spaces therebetween, and an inlet for a first gas stream; wherein said first gas stream passes through said plurality of tubes of said first membrane;
a second membrane member comprising a plurality of tubes having interstitial spaces therebetween, and an inlet for a second gas stream; wherein said second gas stream passes through said plurality of tubes of said second membrane; and
means for directing a portion of said first gas stream that has passed through the plurality of tubes of said first membrane through
  i. the interstitial spaces of said first membrane member;
  ii. the interstitial spaces of said second membrane member; and
  iii. an outlet in said first membrane; wherein said outlet supplies dried air to downstream components.

13. The apparatus of claim 12, wherein said plurality of tubes in said first and second membrane members are more permeable to water vapor than to gas.

14. The apparatus of claim 12, wherein said first membrane member is disposed within a first housing.

15. The apparatus of claim 12, wherein said second membrane member is disposed within a second housing.

16. The apparatus of claim 12, wherein said first and second membrane members are disposed within a single unitary housing.

17. The apparatus of claim 16, wherein the unitary housing is extruded from at least one polymeric material.

18. The apparatus of claim 17, wherein the polymeric material is selected from at least one of polyvinylchloride (PVC), acetal, polybutyleneterephthalate (PBT), polyethyleneterephthalate (PET), polyetherimides, polyphenylene sulfides, fiber reinforced polyvinylchloride (PVC), fiber reinforced acetal, fiber reinforced polybutyleneterephthalate (PBT), fiber reinforced polyethyleneterephthalate (PET), fiber reinforced polyetherimides, fiber reinforced polyphenylene sulfides, and mixtures thereof.

19. The apparatus of claim 17, wherein the unitary housing is extruded from at least one metallic material.

20. The apparatus of claim 12, wherein each of the plurality of tubes in each of the first and second membrane members is a hollow fiber formed from a permeable material.

21. The apparatus of claim 20, wherein the hollow fibers are formed from at least one of polysulfones, polyethersulfones, polyarylsulfones, polycarbonates, nylons, polyimides, polyvinylidenedifluorides, polyvinylidenedichlorides, cellulosics, polyacrylonitriles, and mixtures thereof.

22. The apparatus of claim 12, wherein the first and second membrane members are formed from flat sheet membranes.

23. The apparatus of claim 12, wherein each of the first and second membrane members further comprise two opposed polymeric tubesheets.

24. The apparatus of claim 12, wherein each of the first and second membrane members is generally cylindrically shaped.

25. The apparatus of claim 12, wherein the supply gas has an operating pressure ranging between about 60 psig and about 140 psig.

26. The apparatus of claim 12, wherein said gas stream is at an operating pressure ranging between 0 psig and about 140 psig.

27. The apparatus of claim 12, wherein the first housing further comprises means for bypassing the supply gas around the first membrane member.

28. The apparatus of claim 27, wherein the supply gas bypassing means comprises:

a bypass channel; and a normally closed one-way flow valve operatively disposed in the bypass channel, the valve having a flow entry side and a flow exit side, wherein the valve opens at a predetermined pressure difference between the flow entry side and the flow exit side.

29. The apparatus of claim 12, wherein the apparatus is connected to a commercial vehicle.

30. The apparatus of claim 12 further comprising means for decompressing the portions of air directed to said Interstitial spaces of said first and second membrane members.

31. An apparatus for dehydrating gas in a gas controlled and powered system having a control gas and a supply gas, the apparatus comprising:

a first membrane member comprising a plurality of tubes having interstitial spaces therebetween, and defining a flow path for the supply gas;

a second membrane member comprising a plurality of tubes having interstitial spaces therebetween, and defining a flow path for the supply gas; and means for directing a portion of the supply gas through the interstitial spaces of said first and second membrane members;

wherein said second membrane member is disposed within a second housing; wherein said second housing comprises a second inlet and a second outlet connected by the second membrane member plurality of tubes, wherein said second inlet and said second outlet are connected to the control gas.

32. The apparatus of claim 31, wherein said second housing further comprises a second vent.

33. The apparatus of claim 31, wherein the second housing further comprises means for bypassing the control gas around the second membrane member.

34. The apparatus of claim 33, wherein the control gas bypassing means comprises a bypass tube defined in the second membrane member, the bypass tube in fluid communication with the second housing inlet and outlet.

35. An apparatus for dehydrating air in a pneumatically controlled and powered trailer braking system having control air and supply air, the apparatus comprising:

a first portion of a unitary housing having a first inlet and a first outlet and a flow path therebetween, each of the first inlet and first outlet adapted to be connected to the supply air, the first housing portion further having a first vent;

a first membrane member disposed within the first housing portion and in the flow path, and comprising a plurality of tubes having interstitial spaces therebetween, each tube being more permeable to water vapor than to air, wherein after the supply air has passed through the first membrane member, the supply air becomes substantially dehydrated supply air;

a plenum disposed in the flow path between the first membrane member and the first housing portion outlet;

a first metering orifice, in fluid communication with the plenum and the first membrane member interstitial spaces, for channeling a first predetermined portion of substantially dehydrated supply air to the first membrane member interstitial spaces, whereby the substantially dehydrated supply air portion sweeps at least one of water and water vapor from the first membrane member interstitial spaces to the surrounding environment through the first vent;

a second portion of a unitary housing having a second inlet and a second outlet and a flow path therebetween, each of the second inlet and second outlet adapted to be connected to the control air, the second housing portion further having a second vent;

a second membrane member disposed within the second housing portion and in the second housing portion flow path, and comprising a plurality of tubes having interstitial spaces therebetween, each tube being more permeable to water vapor than to air, wherein infer the control air has passed through the second membrane member, the control air becomes substantially dehydrated control air;

a flow channel defined in the second housing portion and in fluid communication with the second membrane member interstitial spaces; and a second metering orifice, in fluid communication with the plenum and the flow channel, for directing a second predetermined portion of substantially dehydrated supply air to the second membrane member interstitial spaces, whereby the substantially dehydrated supply air portion sweeps at least one of water and water vapor from the second membrane member interatitial spaces through the second vent;

wherein each of the plurality of tubes in each of the first and second membrane members is a hollow fiber formed from a permeable material;

and wherein each of the first and second membrane members further comprise two opposed polymeric tubesheets, one adjacent the respective housing portion inlet, and the other adjacent the respective housing portion outlet, wherein the tubesheets orient the respective plurality of tubes therein and allow fluid communication between the respective tubes and the respective inlet and outlet, while disallowing fluid communication between the respective interstitial spaces and the respective inlet and outlet.

36. The apparatus of claim 35, wherein the second vent is in fluid communication with the first membrane member interstitial spaces, whereby the at least one of water and water vapor swept from the second membrane member interstitial spaces is swept out the first vent.

37. The apparatus of claim 35, wherein the first housing portion further comprises means for supply air bypassing the first membrane member, the supply air bypassing means comprising:
  a bypass channel defined in the first housing portion and in the flow path between the first inlet and first outlet; and
  a normally closed one-way flow valve operatively disposed in the bypass channel, the valve having a flow entry side and a flow exit side, wherein the valve opens at a predetermined pressure difference between the entry side and the exit side.

38. The apparatus of claim 35, wherein the second housing further comprises means for control air bypassing the second membrane member, the control air bypassing means comprising a bypass tube defined in the second membrane member, the bypass tube being in fluid communication with the second inlet and second outlet.

39. The apparatus of claim 35, wherein the unitary housing is extruded from at least one polymeric material.

40. The apparatus of claim 35, wherein the hollow fibers are formed from at least one of polysulfones, polyethersulfones, polyarylsulfones, polycarbonates, nylons, polyimides, polyvinylidenedifluorides, polyvinylidenedichlorides, cellulosics, polyacrylonitriles, and mixtures thereof.

41. The apparatus of claim 35, wherein each of the first and second membrane members is formed from anodic aluminum oxide flat sheet membranes.

42. The apparatus of claim 35, wherein each of the first and second membrane members is generally cylindrically shaped.

43. The apparatus of claim 35, wherein the supply air is at an operating pressure ranging between about 100 psig and about 140 psig, and wherein the control air is at an operating pressure ranging between 0 psig and about 20 psig.

44. The apparatus of claim 35, wherein the unitary housing has two ends, and wherein each of the first inlet and first outlet and each of the second inlet and second outlet are defined in one of the two housing ends.

45. The apparatus of claim 44, wherein the second housing portion further comprises valved means for control gas bypassing the second membrane member.

46. An apparatus for dehydrating gas in a gas controlled and powered system having a control gas and a supply gas, the apparatus comprising:
  a first membrane member comprising a plurality of tubes having interstitial spaces therebetween, and defining a flow path for the supply gas;
  a second membrane member comprising a plurality of tubes having interstitial spaces therebetween, and defining a flow path for the supply gas; and
  one or more a metering orifices for directing a portion of the supply gas through the interstitial spaces of said first and second membrane members;
  wherein said first membrane is disposed within a first housing and said second membrane is disposed within a second housing, wherein said first housing comprises a first inlet and a first outlet connected by the first membrane member plurality of tubes, wherein said first inlet and said first outlet are connected to the supply gas, and a first vent, and said second housing comprises a second inlet and a second outlet connected by the second membrane member plurality of tubes, wherein said second inlet and said second outlet are connected to the control gas, and a second vent.

47. The apparatus of claim 46, wherein the first housing further comprises means for bypassing the supply gas around the first membrane member.

48. The apparatus of claim 47, wherein the supply gas bypassing means comprises:
  a bypass channel defined in the first housing and in the flow path between the first housing inlet and first housing outlet; and
  a normally closed one-way flow valve operatively disposed in the bypass channel, the valve having a flow entry side and a flow exit side, wherein the valve opens at a predetermined pressure difference between the flow entry side and the flow exit side.

49. The apparatus of claim 46, wherein the second housing further comprises means for bypassing the control gas around the second membrane member.

50. The apparatus of claim 49, wherein the control gas bypassing means comprises a bypass tube defined in the second membrane member, the bypass tube in fluid communication with the second housing inlet and outlet.

51. The apparatus of claim 46, wherein said first housing and said second housing are combined into a single unitary housing.

52. An apparatus for drying at least two compressed air streams comprising:
  a first membrane member, wherein said first membrane member includes:
    i. an inlet, said inlet receiving a first compressed air stream;
    ii. an outlet;
    iii. a plurality of tubas connecting said first membrane member inlet and said first membrane member outlet; and
    iv. a flow channel formed by a set of interstitial space surrounding said second membrane member plurality of tubes; and
  a second membrane member, wherein said second membrane member includes:
    i. an inlet, said inlet receiving a second compressed air stream;
    ii. an outlet;
    iii. a plurality of tubes connecting said second membrane member inlet and said second membrane member outlet; and
    iv. a flow channel formed by a set of interstitial spaces surrounding said second membrane member plurality of tubes; and
  a metering device located between the first membrane member plurality of tubes and the first membrane member outlet; wherein air flowing through said first membrane member plurality of tubes is divided into three outlet portions of air:
  a first portion of said outlet portions of air which is delivered to the first membrane member flow channel,
  a second portion of said outlet portions of air which is delivered to the second membrane flow channel, and
  a third portion of said outlet portions of air which is delivered to said outlet of said first membrane member.

53. The apparatus of claim 52, wherein said plurality of tubes of said first and second membrane members are more permeable to water vapor than to gas.

54. The apparatus of claim 52, wherein said first and second membrane members each further comprise a vent located at an end of their respective flow channels, wherein said vents vent wet air to atmosphere.

55. The apparatus of claim 52 further comprising means for decompressing said first and second portions of portioned air prior to delivery to said first membrane member flow channel and said second membrane flow channel, respectively.

56. The apparatus of claim 52, wherein said first compressed air stream has an operating pressure ranging between about 60 psig and about 140 psig.

57. The apparatus of claim 52, wherein said second compressed air stream has an operating pressure ranging between about 0 psig and 140 psig.

58. The apparatus of claim 52, wherein said first compressed air stream is a supply line of a vehicle compressed air braking system and said second compressed air stream is a control line for a vehicle compressed air braking system.

59. The apparatus of claim 52, wherein said first and second membrane members are disposed within a unitary housing.

60. The apparatus of claim 52, wherein the apparatus is connected to a commercial vehicle.

61. The apparatus of claim 52, further comprising a means for bypassing said first compressed air steam around said first membrane member.

62. A vehicle compressed air braking system comprising:
- a first compressed air stream, wherein said first compressed air steam is a vehicle brake system supply line, which has an operating pressure between about 60 psig and 140 about psig;
- a second compressed air stream, wherein said second compressed air strum is a vehicle brake system control line, which has an operating pressure between about 0 psig and about 140 psig, said operating pressure of said control line being substantially close to 0 psig except when said vehicle brake systemic is actuated;
- a membrane dryer comprising:
  i. a first membrane member including an inlet which rewires said first compressed air stream, an outlet, a plurality of tubes connecting said inlet and said outlet of the first membrane member, and a flow channel formed about the outer walls of said plurality of tubes of said first membrane members;
  ii. a second membrane member including an inlet which receives said second compressed air stream, an outlet, a plurality of tubes connecting said inlet and said outlet of the second membrane member, and a flow channel formed about the outer walls of said plurality of tubes of said second membrane member;
  iii. a metering mechanism that portions the first compressed air stream, after it has passed through said plurality of tubes of said first membrane member, into at least three portions; a first portion being decompressed and then passed through said flow channel of said first membrane member, a second portion being decompressed and then passed through said flow channel of said second membrane, and a third portion which is delivered to one or more downstream components.

63. The system of claim 62, wherein said plurality of tubes of said first and second membrane members are more permeable to water vapor than to gas.

* * * * *

UNITED STATES PATENT AND TRADEMARK OFFICE
CERTIFICATE OF CORRECTION

PATENT NO. : 6,764,529 B2
DATED : July 20, 2004
INVENTOR(S) : Randall W. Nichols et al.

It is certified that error appears in the above-identified patent and that said Letters Patent is hereby corrected as shown below:

<u>Title page,</u>
Item [57], ABSTRACT,
Line 16, please insert -- the -- between "from" and "second"
Line 16, please insert -- membrane -- between "second" and "member"

<u>Column 11,</u>
Line 66, please delete "act" and insert -- set --

<u>Column 13,</u>
Line 22, please delete "the supply" and insert -- said first --
Line 22, please insert -- stream -- between "gas" and "has"
Line 25, please insert -- second -- between "said" and "gas"
Lines 28-29, please delete "wherein the first housing further comprises" and insert -- comprising --
Line 29, please delete "the supply" and insert -- said first --
Line 30, please insert -- stream -- before "around"
Line 31, please insert "the supply" and insert -- said first --
Line 32, please insert -- stream -- before "bypassing"
Line 42, please delete "Interstitial" and insert -- interstitial --

<u>Column 14,</u>
Line 41, please delete "infer" and insert -- after --

<u>Column 15,</u>
Line 61, please delete "a" following more

<u>Column 16,</u>
Line 37, please delete "tubas" and insert -- tubes --
Line 40, please delete "space" and insert -- spaces --

<u>Column 17,</u>
Lines 26 and 30, please delete "steam" and insert -- stream --
Line 32, please delete "140 about" and insert -- about 140 --
Line 34, please delete "strum" and insert -- stream --

UNITED STATES PATENT AND TRADEMARK OFFICE
CERTIFICATE OF CORRECTION

PATENT NO.   : 6,764,529 B2
DATED        : July 20, 2004
INVENTOR(S)  : Randall W. Nichols et al.

It is certified that error appears in the above-identified patent and that said Letters Patent is hereby corrected as shown below:

Column 18,
Line 8, please delete "rewires" and insert -- receives --
Line 12, please delete "members"a nd insert -- member --

Signed and Sealed this

Thirty-first Day of May, 2005

JON W. DUDAS
*Director of the United States Patent and Trademark Office*